(No Model.)

V. BARKER.
GREEN CORN CUTTING MACHINE.

No. 302,376. Patented July 22, 1884.

WITNESSES
Phil C. Dietrich.
Howard Edmonds.

INVENTOR
Volney Barker
By F. C. Somes,
Attorney (No Model.)　　　　　V. BARKER.　　　5 Sheets—Sheet 3.
GREEN CORN CUTTING MACHINE.
No. 302,376.　　　　　Patented July 22, 1884.
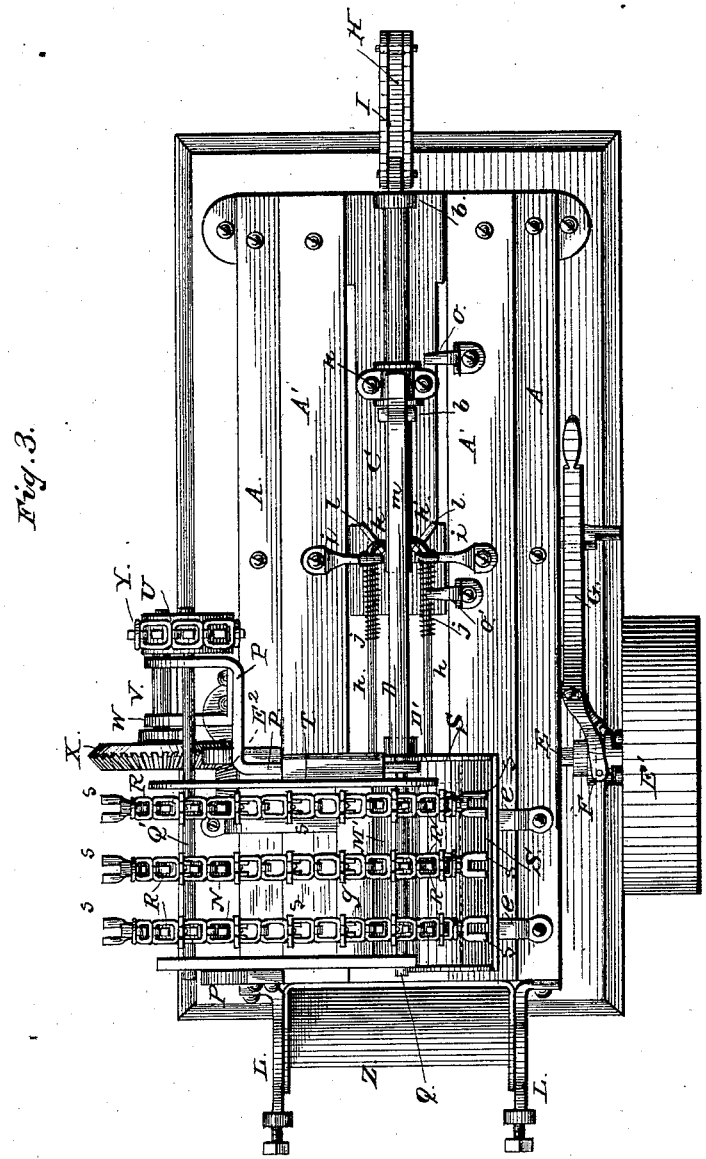

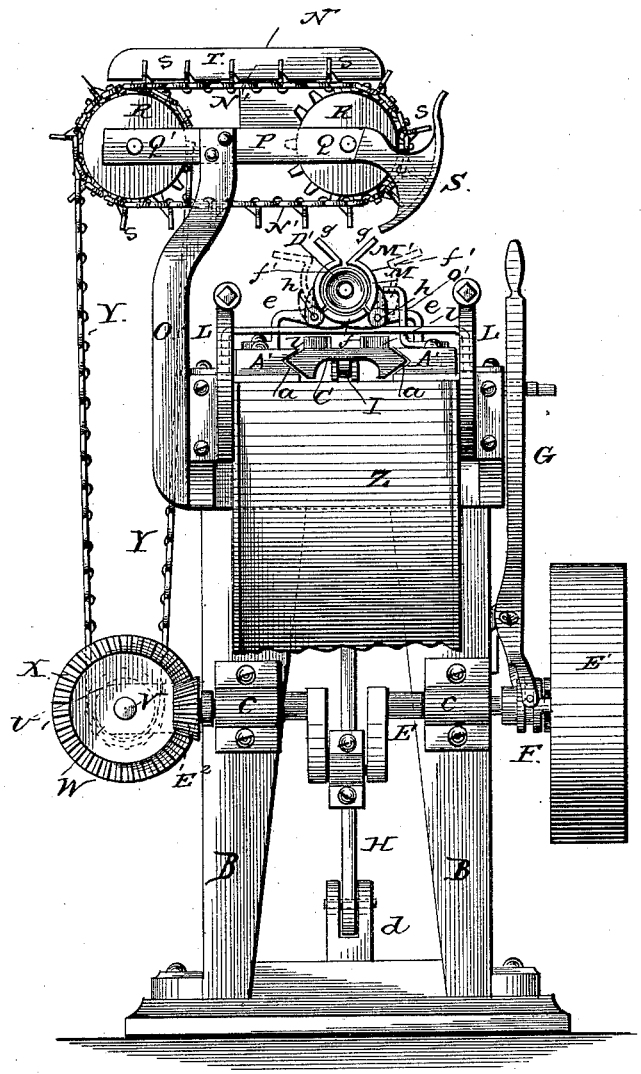

(No Model.)
V. BARKER.
GREEN CORN CUTTING MACHINE.
No. 302,376. Patented July 22, 1884.
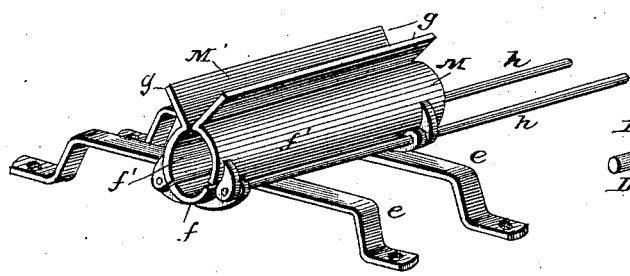
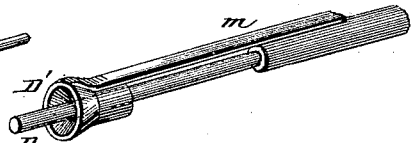
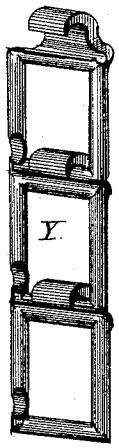
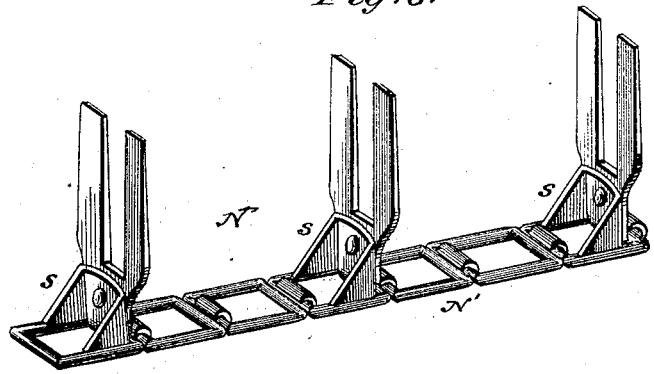
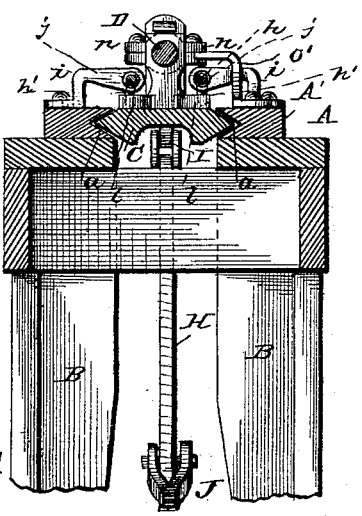

UNITED STATES PATENT OFFICE.

VOLNEY BARKER, OF PORTLAND, MAINE.

GREEN-CORN-CUTTING MACHINE.

SPECIFICATION forming part of Letters Patent No. 302,376, dated July 22, 1884.

Application filed October 29, 1883. (No model.)

*To all whom it may concern:*

Be it known that I, VOLNEY BARKER, a citizen of the United States of America, residing at Portland, in the county of Cumberland and State of Maine, have invented a certain new and useful Improvement in Green-Corn-Cutting Machines, of which the following is a description sufficiently full, clear, and exact to enable any person skilled in the art to which said invention appertains to make and use the same, reference being had to the accompanying drawings, forming a part of this specification.

This invention relates to that class of machines for cutting green corn from the cob in which the ears of corn are forced endwise between expanding gaged knives and scrapers by means of a horizontal sliding plunger.

The object of the invention is to provide a more rapid and efficient means of feeding the ears of corn to the cutting devices than has heretofore been in use.

Figure 1:
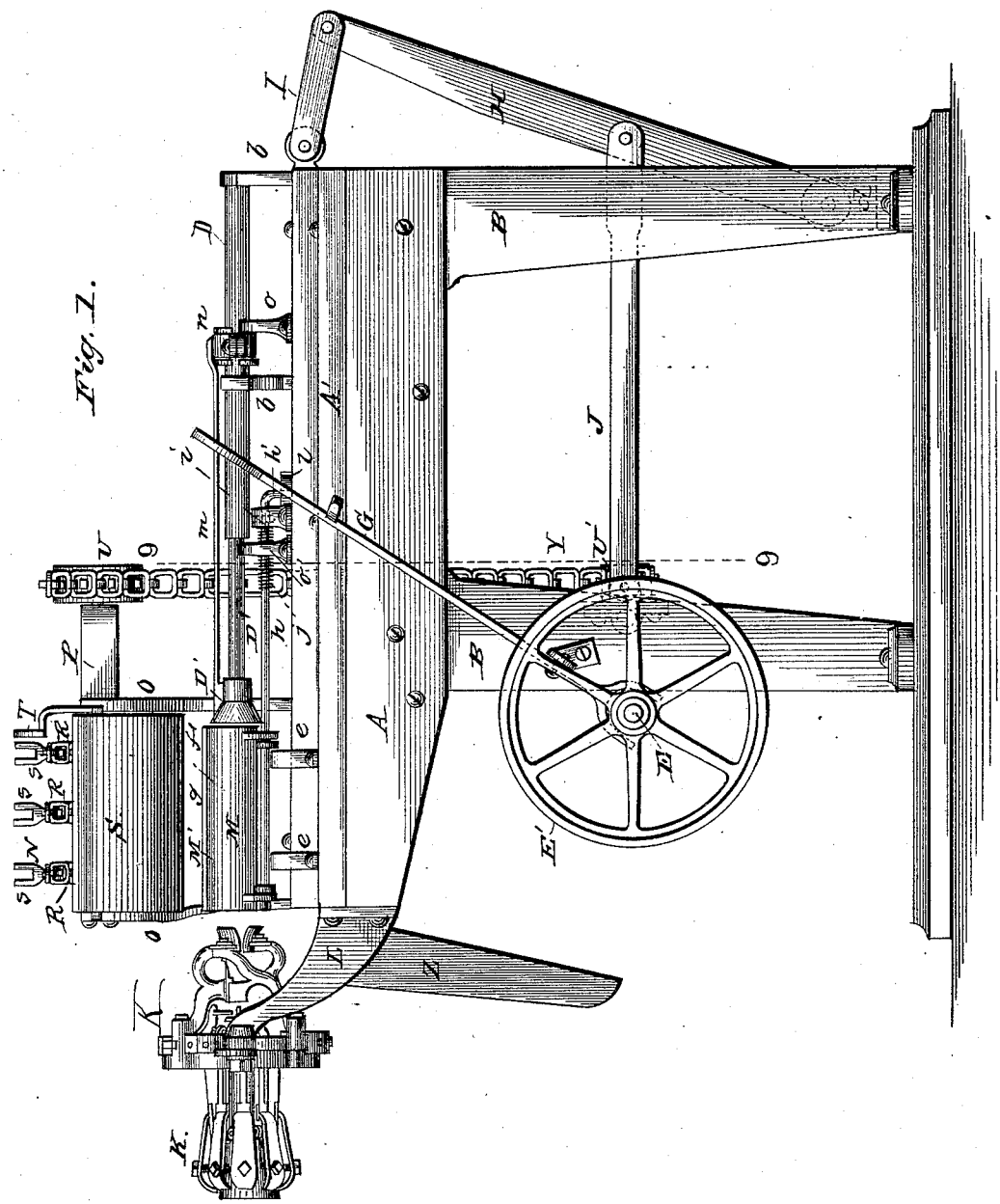
Figure 2:
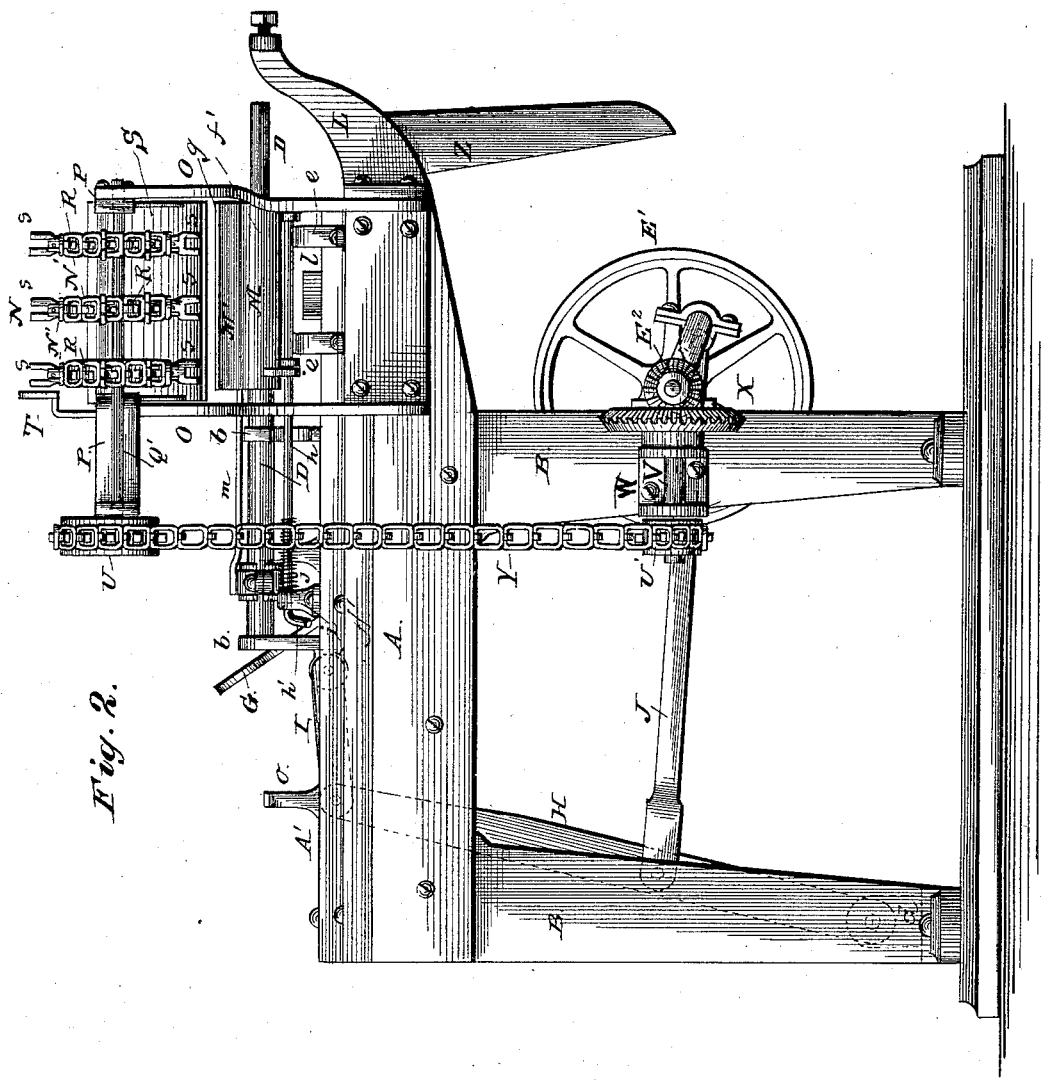

In the accompanying drawings, which represent a convenient arrangement of parts for carrying out the object of this invention, Figure 1 is an elevation of one side of the machine. Fig. 2 is an elevation of the opposite side thereof with the cutter-head removed. Fig. 3 is a plan or top view thereof. Fig. 4 is an elevation of the front end of the machine with the cutter-head removed and a portion of the discharge-spout broken away. Fig. 5 is a perspective view of the guiding-trough or feed-barrel, which receives the ears successively from the feed-apron and guides them to the cutter-head. Fig. 6 is a perspective view of the plunger and the centering-cup thereon. Fig. 7 is a perspective view of several connecting-links of the motion-transmitting belt. Fig. 8 is a perspective view of a portion of one of the chains provided with upright attachments, which form part of the endless feeding-apron. Fig. 9 is a transverse section of the machine on line 9 9 of Fig. 1.

Similar letters of reference indicate corresponding parts.

The frame of this machine consists of a horizontal bench, A, supported on legs B, and provided at the top with longitudinal guide-rails A', having V-shaped guide-grooves $a$ facing each other.

A horizontal carriage or cross-head, C, adapted to slide longitudinally in the guide-grooves $a$, is provided with short standards $b\,b$, one at its rear end and the other near the center of its length. An elongated plunger, D, is fixed to and supported by these standards.

A transverse driving crank-shaft, E, carrying a driving-pulley, E', at one end and a bevel-pinion, E², at the opposite end, is supported in bearings $c\,c$, attached to the front legs of the frame. The driving-pulley E is adapted to turn loosely on the shaft, excepting when held by means of a clutch, the clutch-box F of which is adapted to slide on a spline on the shaft, and is operated by the shipper-lever G, while the counterpart of the clutch is attached to the hub of the driving-pulley.

An upright lever, H, is pivoted to a bracket, $d$, between the hind legs of the frame, and extends upward to a point opposite the sliding carriage C, to which its upper end is connected by means of a link, I. This upright lever is connected to the crank of the driving-shaft by means of a connecting-rod, J. Fast and loose pulleys may be employed instead of a single pulley and clutch.

A cutter-head, K, is arranged at the front end of the machine, with its axis in line, or nearly so, with that of the plunger, being attached to the arms L, which project from the front end of the machine, or to other suitable supports. A non-rotary cutter-head—such as that described in Letters Patent of the United States No. 243,829, issued to this patentee July 5, 1881, to which reference is made for further description—is preferred; but any suitable cutter-head or arrangement of cutting devices may be employed.

A feed-barrel, M, for guiding the ears to the cutter-head, is supported on bent cross-rails $e\,e$, near the front end of the bench, and arranged in line, or nearly so, with the movement of the plunger and the axis of the cutter-head. This feed-barrel is adapted to closely inclose, without grasping, the ears of corn, and is preferably composed of a curved bottom plate, $f$, and curved sides $f'\,f'$, said sides being hinged to said bottom plate and adapted to open outward for the reception of the ear of corn, and to close around the same while it is being driven into the cutter-head. The upper edges of the hinged sides are provided with inclined or curved flanges $g$, which form, when the barrel is closed, a trough or hopper, M', above the feed-barrel, in which the ear of corn may be deposited preparatory to its admission into the feed-barrel. The feed-barrel is sufficiently large in diameter to close around the corn-ear, so as to prevent the latter being thrown out of position when struck by the centering cup.

Mechanism is provided for automatically opening and closing the feed-barrel during the movement of the plunger, the specific mechanism herein described being novel for that purpose; but when such mechanism is not claimed specifically any suitable mechanism for the purpose is understood. The mechanism shown will now be described. The pintles of the hinges of the feed-barrel, to which the swinging sides thereof are fixed, extend backward horizontally in the form of rods $h\ h$, which pass through inwardly-projecting brackets $i\ i$, attached to the rails A' A' near the center of the bench. The ends $h'\ h'$ of these rods are bent downward at right angles to the axes of the rods; and the rods are surrounded in front of the brackets $i\ i$ by spiral springs $j\ j$, of which the forward ends are attached to the rods and the rear ends bent over the brackets. These springs tend to turn the rods axially, so as to normally hold the feed-barrel in closed position. Lugs $l\ l$, arranged near the front end of the sliding carriage C at an incline to the length of the latter, come in contact with the downwardly-bent ends $h'\ h'$ of the rods $h\ h$ when the carriage is near the rear end of its movement, and cause the rods to turn and the sides of the feed-barrel to swing open. When the ends of the rods are released from the lugs, the feed-barrel closes under the action of the springs. A conical centering-cup, D', slightly smaller in diameter than the feed-barrel, for raising the ear of corn into line with the axis of the cutter-head, is reciprocated by frictional contact with the plunger D, being attached to a horizontal arm, $m$, the rear end of which is connected to a friction-clamp, $n$, surrounding the plunger-rod. A stop, $o$, near the rear end of the bench, arrests the clamp on the backward stroke of the plunger and causes the centering-cup to remain stationary at the rear end of the feed-barrel, and a similar stop, $o'$, near the center of the bench, arrests the forward movement of the clamp and stops the centering-cup at the front end of the feed-barrel. The friction of the clamp is sufficient to hold the centering-cup to its place in front of the plunger until the ear is brought into line with the axis of the head, and such as to permit the cup to yield or recede automatically on the plunger and the plunger to come in contact with the butt of the ear at the beginning of its forward stroke. The clamps may be tightened or loosened, so as to secure the proper tension.

A shallow trough, open at the top, such as that shown in Letters Patent of the United States above referred to, has heretofore been used in corn-cutting machines for the reception of the ear preparatory to its being driven through the cutter-head by the plunger. Such a receptacle answers the purpose in hand-machines, when the motion is comparatively slow; but in power corn-cutters, where the movement of the plunger is rapid, such receptacles are found to be inefficient, as the ear, when struck by the lower edge of the centering-cup, will oftentimes be thrown up at an angle to the axis of the cutter-head and beyond the grasp of the centering-cup. A receptacle with hinged sides, designed to clamp and center the ear, has also been employed; but such a device could not be used with a centering-cup without destroying its function as a centering device. As a centering device it is comparatively inefficient, and the corn is liable to be crushed or injured thereby.

A centering-cup has heretofore been shown in connection with a V-shaped feed-trough provided with vertical wings hinged to the upper edges of said trough, the upper edges of said wings being provided with angular flanges, which form an open-bottomed supplementary V-shaped hopper above the trough when the wings are in vertical position. In this case the vertical hinged wings are designed merely as a support for the supplementary hopper, and do not closely surround the ear, so as to co-operate with the centering-cup and prevent the ear from being thrown out of position and released by the cup when struck by the latter. To avoid these objections, my feed-barrel, preferably cylindrical in form, is adapted to shut closely around the ear without grasping it, and a cup-shaped centering device attached to the plunger and adapted to fit and slide closely within said barrel, preferably without contact therewith, is employed, whereby the ear is completely inclosed without pressure, and cannot escape the embrace of the cup.

A plunger provided with a sliding plunger-head has heretofore been used in corn-cutter machines, said plunger-head serving to center the ear and also to drive it into the cutter-head, the plunger proper or plunger-rod serving to drive it through the latter. In such case the plunger-head is locked to or rigidly connected with the plunger, so as to receive a positive forward movement until it reaches the cutter-head, at which point it is made to release the ear, which latter is then struck by the plunger-rod and driven entirely through the cutter-head. The plunger-head being slightly in advance of the plunger when it releases the ear, the latter stops for an instant until the plunger reaches it. At the time of its release by the plunger-head the ear is at the point of greatest resistance, the thick part thereof being just within the knives and scrapers, and when the quickly-moving plunger strikes it in this position the force of the blow frequently splits the cob and the ear is destroyed, since the machine will only operate successfully upon unsplit ears. In my arrangement the conical cup acts merely as a centering device, and the plunger operates upon the ear at or near the beginning of its stroke, pushing it steadily into and through the cutter-head and avoiding the difficulty above mentioned.

An endless feeding-apron, N, for supplying the ears in regular succession to the hopper, is elevated over the bench A transversely thereto, near one end, and above the feed barrel and hopper. Standards O O, attached to the rear side of the bench, support two transverse rails, P P, in which shafts Q Q' have their bearings. These shafts support sprocket-wheels, which support and move the endless feeding-apron. This apron is preferably composed of a series of endless chains, N', stretched between sprocket-wheels R, fixed to said shafts, two or more of said chains being arranged side by side or at short distances apart. The several chains are provided with a series of upright lugs, s, preferably in the form of forks, arranged transversely to the links and at such distances apart thereon as to form compartments or buckets on the apron of a width sufficient to receive ears of the largest size. These lugs are shown as attached to every third link of the chains of the feeding-apron, said links being cast with angular flanges on three sides, to which the forks are riveted. A curved guide-plate, S, is arranged transversely to the endless feeding-apron at the descending turn thereof, and at a distance therefrom about equal to the width of a compartment thereof. This plate extends from a point on a line or nearly so with the outer or upper edges of the partitions of the upper side of the apron to a point on a line or nearly so with the outer or lower edges of the partitions on the under side of the apron. This curved guide-plate serves to hold the ears in their several compartments until the apron has completed its descending turn, and then permits their discharge laterally under control into a suitable receptacle, or into the hopper M', above the feed-barrel M. This prevents bruising of the tender kernels of green corn, which might occur when the ears are allowed to drop of their own gravity from the apron at the beginning of the turn. I do not, however, confine myself in all cases to the use of this guide-plate or to the specific construction thereof when used. A stationary guard or fence, T, is arranged above the feeding-apron at the one side thereof, and serves as a guide to the operator in placing the ears on the apron. The shaft Q' is longer than the shaft Q, and carries a pulley or sprocket-wheel, U, at one end. A short shaft, V, having its bearings in a bracket, W, attached to one of the front legs of the frame, carries at one end a bevel-gear, X, which meshes with the bevel-pinion $E^2$ on the driving-shaft E, and at the other end a pulley or sprocket-wheel, U'. An endless belt or chain, Y, running over the pulleys or sprocket-wheels U U', transmits motion to the feeding-apron. This chain is preferably composed of square links, the upper bars of which are hook-shaped in cross-section, the links being interlocked by the hook-shaped upper bar of one link grasping the plain lower bar of the link above.

The proportions of the motion-transmitting mechanism are such that the feeding-apron is moved a distance equal to the width of one of the compartments thereof at each revolution of the crank-shaft, so that a regulated feed is obtained, an ear being supplied to the feed-barrel and another driven through the cutter-head for each stroke of the plunger. The feeding-apron may be of a length sufficient to enable several persons to work to advantage in laying on ears of corn.

It will be obvious that the feeding-apron herein described may be used in connection with a common feed-trough, if desired.

The operation is as follows: The machine is started by moving over the lever, causing the locking of the driving-pulley to the crank-shaft, so that the motion of the former will be imparted to the latter. The ears of corn to be cut are placed by the operator in the compartments of the feeding-apron on the upper side thereof, preferably with their butt-ends resting against the fence, and are carried along in the direction of the arrow, Fig. 4, and allowed to descend at the front thereof, being there supported by the curved guide-plate S and the partitions of the apron, from which they drop into the hopper M', and thence into the feed-barrel M, or directly into said feed-barrel. Assuming, for convenience of description, that the operative parts of the machine are in the positions shown in Figs. 1 and 3, and that the feed-barrel and forward compartments of the feeding-apron each contain an ear of corn, the following is a statement of what takes place during a single revolution of the crank-shaft E: In the position referred to the plunger D is at the end of its backward stroke, the feed-barrel M is held open by contact of the inclines $l\ l$ of the carriage C with the bent ends $h'\ h'$ of the rods $h\ h$, and the centering-cup D' is at the forward end of the plunger, with its flaring sides projecting beyond the same. At the beginning of the forward stroke of the plunger the lugs $l\ l$ of the carriage release the ends $h'\ h'$ of the rods $h\ h$, and the springs $j\ j$ cause the sides $f'\ f'$ of the feed-barrel to close around the ear just as the centering-cup enters the barrel. The centering-cup comes in contact with the ear and drives it forward until its pointed end enters between the flaring gages of the cutter-head, the closely-encircling sides of the feed-barrel preventing its butt-end from being thrown up by the blow of the cup beyond the reach of the latter, and yet permitting it to slide freely within the barrel. As soon as the pointed end of the ear reaches the gages, resistance begins, and the pressure causes the butt-end to find the center of the cup, and the ear is thereby brought into line with the axis of the cutter-head. As the pressure increases, the centering-cup yields slightly, and the end of the plunger comes in contact with the butt of the ear at the early part of the forward stroke. The ear is then pushed steadily by continuous pressure of the plunger into and through the cutter-head, the knives of which shave the corn closely from the cob, the cut corn dropping down into a suitable receptacle, into which it is guided by the spout Z, the cob being driven out at the end of the cutter-head. The carriage then moves back, carrying the plunger on its backward stroke. The centering-cup is arrested at the front and rear ends of the feed-barrel during the forward and backward strokes of the plunger, respectively. During the time of the forward and backward strokes of the plunger the feeding-apron moves a distance equal to one of the spaces between the partitions, and permits an ear of corn to drop from the guide-plate S into the hopper M', and as the carriage nearly reaches the end of its backward movement the hopper opens and said ear is dropped into the feed-barrel ready for the next forward stroke of the plunger; or the parts may be so adjusted that an ear space or compartment of the feeding-apron will arrive directly over the feed barrel or hopper at the same time that the plunger reaches the end of its backward stroke, so that the ear will be dropped directly into the feed-barrel.

The operation just described is repeated at each revolution of the crank-shaft. I have operated a machine in this way at the rate of eighty revolutions per minute, cutting an ear successfully at each revolution, and this speed may be increased to one hundred revolutions a minute and upward.

I claim as my invention and desire to secure by Letters Patent—

1. The combination, substantially as described, of a feed-barrel composed of a stationary curved trough and curved sides hinged to said trough, a reciprocatory centering-cup adapted to fit said barrel, a plunger, and a cutter-head.

2. The combination, substantially as set forth, of a feed-barrel composed of a stationary curved trough and curved sides hinged to said trough, a reciprocatory centering-cup adapted to fit said barrel, a plunger, a cutter-head, and devices for automatically opening and closing said feed-barrel.

3. The combination, substantially as set forth, of a feed-barrel composed of a stationary curved trough and curved sides hinged to said trough, said sides being provided with wings which form a hopper above said barrel when the sides are closed, a reciprocatory centering-cup adapted to fit said barrel, a plunger, and a cutter-head.

4. The combination, substantially as set forth, of a feed-barrel composed of a stationary curved trough and curved sides hinged to said trough, said sides being provided with wings which form a hopper above said barrel when the sides are closed, a reciprocatory centering-cup adapted to fit said barrel, a plunger, a cutter-head, and devices for automatically opening and closing said barrel during the stroke of the plunger.

5. The combination, substantially as set forth, of a cutter-head adapted to shave an ear of corn, a feed-barrel adapted to closely inclose the ear, a plunger, and a centering-cup having a frictional connection with the plunger.

6. The combination, substantially as set forth, of a cutter-head adapted to shave an ear of corn, a plunger for driving the corn-ear through the cutter-head, a centering-cup adapted to slide on the plunger, a friction-clamp on the plunger-rod, an arm connecting said centering-cup with said clamp, and means for arresting said clamp during the forward and backward stroke of the plunger.

7. The combination, substantially as set forth, of a cutter-head for shaving ears of corn, a plunger, a receptacle for guiding the ears to the cutter-head, an endless feeding-apron provided with transverse partitions for conveying the ears in succession to said receptacle, and mechanism for reciprocating said plunger and simultaneously moving said feeding-apron a distance equal to the width of one compartment thereof during each full stroke of the plunger.

8. The combination, substantially as set forth, of a cutter-head for shaving ears of corn, a plunger, a feed-barrel adapted to closely inclose an ear of corn, a reciprocatory centering-cup, an endless feeding-apron provided with transverse partitions for conveying the ears in succession to said feed-barrel, and mechanism for reciprocating said plunger and simultaneously moving said feeding-apron a distance equal to the width of one compartment thereof during each full stroke of the plunger.

9. The combination, substantially as set forth, of a cutter-head for shaving ears of corn, a plunger, a receptacle for guiding the ears to the cutter-head, an endless feeding-apron provided with transverse partitions for conveying the ears in succession to said receptacle, a guide-plate arranged transversely to said feeding-apron at the descending turn thereof, and mechanism for reciprocating said plunger and simultaneously moving said feeding-apron a distance equal to the width of one compartment thereof during each full stroke of the plunger.

10. The combination, substantially as set forth, of a cutter-head for shaving ears of corn, a plunger, a feed-barrel adapted to closely inclose an ear of corn, provided with hinged sides which form a hopper above the barrel when the latter is closed, means for automatically opening and closing said barrel, an endless feeding-apron provided with transverse partitions, and mechanism for reciprocating said plunger and simultaneously moving said feeding-apron a distance equal to the width of one compartment thereof during each full stroke of the plunger.

11. The combination, substantially as set forth, of a cutter-head for shaving ears of corn, a plunger, a centering-cup, a feed-barrel adapted to closely inclose an ear of corn, provided with hinged sides having wings which form a hopper above said barrel when the latter is closed, means for automatically opening and closing said barrel, an endless feeding-apron provided with transverse partitions, and mechanism for reciprocating said plunger and simultaneously moving said feeding-apron a distance equal to the width of one compartment thereof during each full stroke of the plunger.

12. The combination, substantially as set forth, of a cutter-head for shaving ears of corn, a plunger, a feed-barrel adapted to closely inclose an ear of corn, provided with hinged sides having wings which form a hopper above said barrel when the latter is closed, means for automatically opening and closing said barrel, an endless feeding-apron provided with transverse partitions, a guide-plate arranged transversely to said feeding-apron at the descending turn thereof, and mechanism for reciprocating said plunger and simultaneously moving said feeding-apron a distance equal to the width of one compartment thereof during each full stroke of the plunger.

13. The combination, substantially as set forth, of a cutter-head for shaving ears of corn, a plunger, a feed-barrel adapted to closely inclose an ear of corn, provided with hinged sides having wings which form a hopper above said barrel when the latter is closed, means for automatically opening and closing said barrel, a reciprocating centering-cup adapted to fit said barrel, an endless feeding-apron provided with transverse partitions, a guide-plate arranged transversely to said feeding-apron at the descending turn thereof, and mechanism for reciprocating said plunger and simultaneously moving said feeding-apron a distance equal to the width of one compartment thereof during each full stroke of the plunger.

14. The combination, substantially as set forth, of an endless feeding-apron provided with transverse partitions forming compartments extending crosswise of the apron and severally of a width about the same as the diameter of an ear of corn, and a curved guide-plate arranged transversely to said feeding-apron at the descending turn thereof, and at a distance therefrom about equal to the width of one of the compartments thereof, the upper edge of said plate being on a line, or nearly so, with the upper edges of the partitions on the upper side of the apron, and the lower edge on a line, or nearly so, with the lower edges of the partitions on the under side of the apron, whereby the ears are retained in the several compartments, and their movements controlled throughout the descending turn of the apron.

15. The combination, substantially as set forth, of a cutter-head for shaving ears of corn, a plunger, a feed-barrel for guiding the ears to the cutter-head, provided with hinged sides, and mechanism for opening and closing said barrel, consisting of spring-hinges having extended pintles, to which said sides are fixed, and inclined lugs on the carriage, which engage the bent ends of the pintles, substantially as described.

16. A cylindrical feed-barrel for corn-cutting machines, composed of a stationary curved trough and curved sides hinged to said trough, substantially as described.

VOLNEY BARKER.

Witnesses:
FRANK E. HITCHINGS,
GEORGE W. COFFIN.